Jan. 22, 1963  P. E. CHANEY  3,074,589
CLOSURE MEANS FOR WITHSTANDING HIGH PRESSURES
Filed June 4, 1959

*INVENTOR.*
PRESTON E. CHANEY
BY
ATTORNEYS

United States Patent Office 3,074,589
Patented Jan. 22, 1963

3,074,589
CLOSURE MEANS FOR WITHSTANDING
HIGH PRESSURES
Preston E. Chaney, Dallas, Tex., assignor to Sun Oil Company, Philadelphia, Pa., a corporation of New Jersey
Filed June 4, 1959, Ser. No. 818,161
2 Claims. (Cl. 220—46)

This invention relates to closure means for withstanding high pressures and has particular utility in the provision of closures for protective casings adapted to enclose apparatus which is to be lowered within bore holes and must withstand the extremely high mud pressures encountered therein. Typically, such protective casings may enclose and be associated with bore hole logging apparatus, bore hole surveying instruments, and the like.

Pressures such as those encountered in bore holes are so high as to produce quite substantial distortions of the walls of protective casings or other enclosures therein. This creates a packing problem since many types of packing used for withstanding more moderate pressures fail to provide proper closures if the elements associated with them are subject to substantial distortion. O-rings are particularly desirable where such conditions occur, because even under substantial relative movements of the surfaces which they pack their flexibility and freedom of movement automatically take care of maintaining tight closures. Furthermore, they are desirably used under conditions where facility of separation of the packed parts is desirable, the O-rings being capable of providing packing where clearances occur and are desirable for assembly and disassembly, particularly where dirt may enter between the surfaces to be closely associated and substantial clearances must be provided to prevent mechanical binding.

O-rings, however, have limitations with respect to the pressures which they will withstand, this limitation particularly arising when the surfaces which they pack must have appreciable clearances for ease of assembly and disassembly, since, then, the clearances determine the pressure limits beyond which extrusion of the O-rings into the clearances may occur.

It is the general object of the present invention to provide a closure assembly which is capable of withstanding extremely high pressures while, nevertheless, when the pressures are removed, a joint is provided which may be readily assembled or disassembled. Briefly stated in accordance with the invention a plug for a protective casing or the like has appreciable clearance with the casing. An O-ring is mounted in the plug for packing purposes. The portion of the casing in the vicinity of the O-ring is made deformable under pressure so that as extreme pressures are applied it binds against the plug eliminating clearance between the surfaces to be packed and thereby preventing the existence of a space into which extrusion of the O-ring can occur.

The invention may also be applied to the provision of a closure capable of withstanding high internal pressures within a chamber and this also constitutes an object of the invention.

The foregoing and other objects of the invention will become apparent from the following description, read in conjunction with the accompanying drawing, in which.

A protective casing is indicated at 2 having through its major portion a wall thickness capable of withstanding the highest pressures expected to be encountered. This casing may be arranged to enclose recording or similar apparatus used in conjunction with well logging, which apparatus is, for example, of the type disclosed in the application of John Bennett, Preston E. Chaney, Jack Weir Jones and Fred M. Mayes, Serial No. 685,717, filed September 23, 1957, or the application of Fred M. Mayes and Jack Weir Jones, Serial No. 818,066, filed June 4, 1959. The foregoing applications disclose well logging apparatus in which a protective casing is required. Other uses of the invention are to be found in protective casings for well surveying instruments of various known types. If the use of magnetic material is not objectionable, the protective casing may be made of steel; but, if non-magnetic casings are required the materials used may be, for example, Monel metal or the like, capable of withstanding high pressures, but not interfering with magnetic field conditions.

Figure 1:
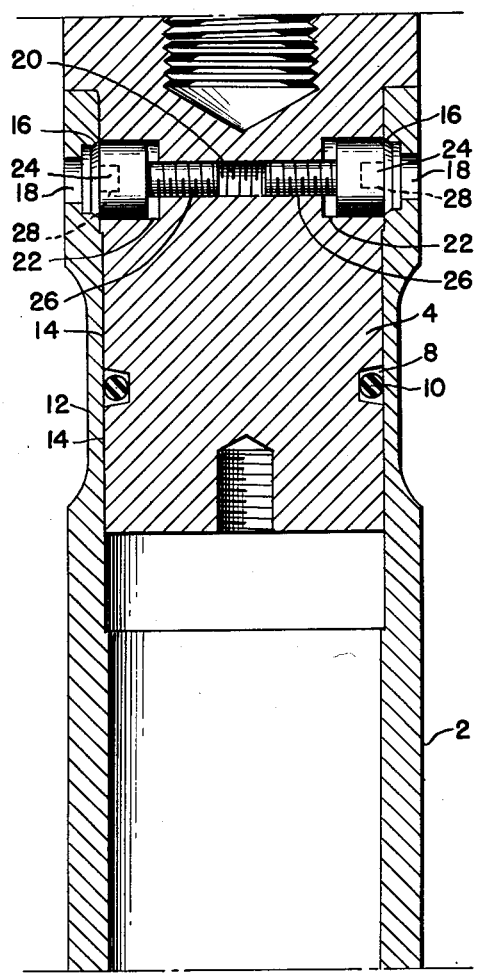
FIGURE 1 is an axial section showing a closure provided at the upper end of a protective casing in accordance with the invention, the arrangement being suitable for withstanding high external pressures.
Figure 2:
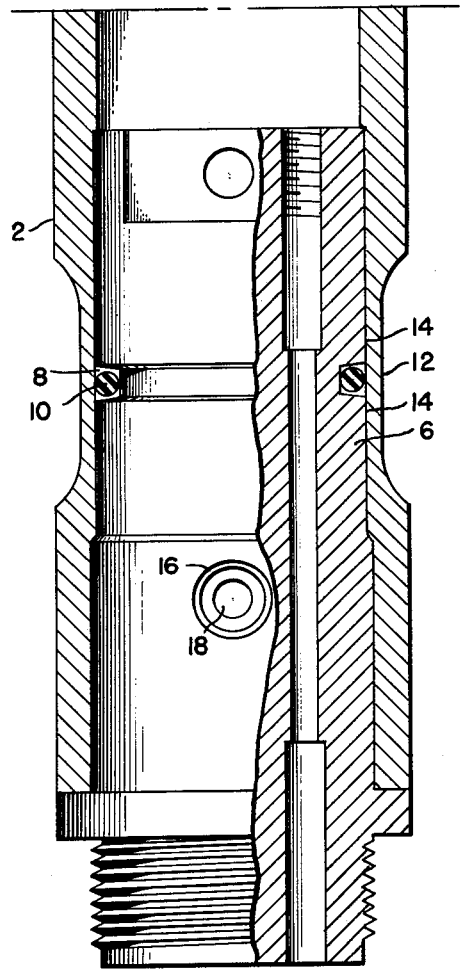
FIGURE 2 is an axial section showing a similar closure provided at the lower end of a protective casing.

Referring to FIGURES 1 and 2 of the drawing, the protective casing 2 is provided with an upper plug 4 and a lower plug 6, both of which involve similar closure construction and may be attached to other elements of the particular device involved. Since the arrangement is the same for both plugs, the lower will be primarily described, though the reference numerals apply to similar parts at both the upper and lower ends of the casing. It will be understood that single or multiple O-rings may be provided, the same being true in the case of the locking elements hereafter described. In many bore hole applications the protective casing 2 may be of very considerable length, depending upon the space required for recording or other apparatus, power supply batteries, or the like.

Considering an arrangement utilizing a single O-ring, the plug is provided with an annular groove 8 for the reception of the O-ring 10, the relative dimensions here involved being in accordance with customary practice which involves the provision of a groove having an axial length exceeding the cross-sectional diameter of the ring. In accordance with the present invention, the portion of the casing in the axial vicinity of the O-ring 10 is thin as indicated at 12 so as to be inwardly deformable under the external pressures which may be encountered, the thickness of material at this thinned section being so chosen that under such high pressures as might otherwise produce extrusion of the O-ring the portion of the casing thereat will be deformed diametrically inwardly so as to provide metal to metal contact at 14 thus eliminating the clearance which is desirably existent under low pressure conditions to facilitate assembly and disassembly. In brief, the major portion of the casing is substantially undeformable under the external pressures and capable of fully sustaining them whereas in the region 12 it is deformable to provide the metal-to-metal contact just indicated.

The result of this design is to provide, consistently with substantial original clearance an arrangement in which the higher the pressure the less possibility exists of any extrusion of the O-ring out of its groove 8 into the clearance to be packed. The arrangement has been found capable of withstanding pressures encountered in the deepest mud-filled bore holes.

The arrangement just described does not, of course, serve to lock the plug and protective casing against axial movements. For this purpose a special locking means is provided which, in particular, avoids projection of any element outside the cylindrical envelope of the protective casing and also avoids the setting up of any stresses which might tend to provide, even locally, clearances into which the O-ring may be extruded. In accordance with the invention, the protective casing, in a region where its wall thickness is maximum, is provided with an opening indicated at 16 provided by a countersink from the inside of an opening 18 of smaller internal diameter. When the plug and housing are assembled there is in line with the opening 18 a threaded bore 20 in the plug which at its outer end or ends is enlarged to a cylinder 22 arranged to receive the bevelled end of a cylindrical head 24 of a screw threaded at 26 into the threaded portion of the bore 20, the head 24 being arranged to enter the countersink 16 snugly to provide locking. The head 24 may be provided with any suitable sockets such as indicated at 28 for a wrench inserted through the opening 18.

Prior to assembly, the screw is threaded inwardly, the head 24 being then seated within the bore 22 so as to clear the internal surface of the casing. When the plug is in place, each screw 26 may be then threaded outwardly to enter the countersink 16. Secure locking is thus obtained without the imposition of any radial strains on the casing which might possibly interfere with the desirable contact produced at 14 under high pressure conditions as described above.

Figure 3:
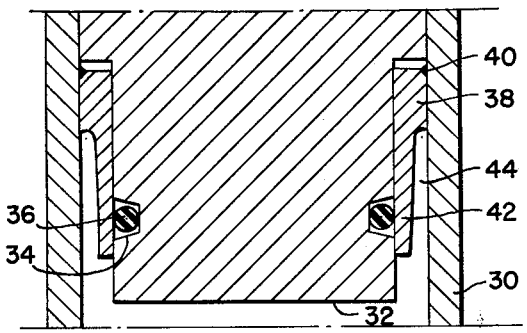
FIGURE 3 is an axial section showing a closure for a chamber having high internal pressures.

FIGURE 3 illustrates the application of the invention to a casing closure wherein the casing is subject to high internal pressures exceeding exterior ones. The casing is indicated generally at 30 and may be of any desired shape, and may be provided with more than one closure of the type illustrated. A closure plug is shown at 32 and is provided with the annular groove 34 for reception of the O-ring 36. An annular interior ring is provided at 38 which may be integral with the casing but generally is more conveniently secured thereto as by welding at 40 whereby it becomes in effect integral with the casing with complete closure against leakage between it and the casing. Extending inwardly is a lip portion 42 which closely embraces the periphery of the plug and extends across the groove 34 containing the O-ring. As will be evident, a space 44 exists outside the ring 42 and the pressure inside the casing is applied in this space to force the ring 42 inwardly to provide tight and extended contact with the exterior of the plug, the high pressure causing the ring 42 to be distorted inwardly, the ring being relatively thinner than the wall 30 of the casing. It will be evident that this arrangement has the same general sealing properties as that previously described, the tight contact of the ring 42 with the plug is the vicinity of the O-ring preventing extrusion thereof.

It will be evident that various changes in details of the invention may be made without departing from the scope of the following claims.

What is claimed is:

1. In combination, a cylindrical metallic casing having a central bore formed by an annular wall of a thickness sufficient to withstand an external fluid pressure of a predetermined magnitude, a cylindrical metallic plug arranged within said bore, said plug having an annular groove, an O-ring located in said groove and engaging the surface of said bore at an axially intermediate portion of said annular wall, said intermediate portion of said annular wall having a thickness less than said first recited thickness so as to be deformable radially inwardly by said external fluid pressure of said predetermined magnitude, thereby providing a tight fluid seal between said casing and said plug and eliminating clearance therebetween into which extrusion of said O-ring could occur.

2. The combination as claimed in claim 1 further including means for locking said casing and plug against relative axial movements, said locking means including at least one socket in said annular wall opening to said bore, said socket being positioned in a portion of said wall which is of said first recited thickness, and a locking member threaded into said plug and adapted to be moved outwardly into engagement with said socket.

References Cited in the file of this patent

UNITED STATES PATENTS

| | | |
|---|---|---|
| 449,169 | O'Brien | Mar. 31, 1891 |
| 1,579,672 | Strecker | Apr. 6, 1926 |
| 2,436,407 | Stephens | Feb. 24, 1948 |
| 2,529,098 | Noll | Nov. 7, 1950 |
| 2,686,610 | Sharpnack | Aug. 17, 1954 |
| 2,690,939 | Whaley | Oct. 5, 1954 |
| 2,839,218 | Zerbe | June 17, 1958 |